United States Patent Office 3,084,157
Patented Apr. 2, 1963

3,084,157
PROCESS FOR THE PRODUCTION OF 6α-FLUORO-CORTISONE AND INTERMEDIATES THEREIN
Howard J. Ringold, Albert Bowers, Octavio Mancera, and George Rosenkranz, all of Mexico City, Mexico, assignors, by mesne assignments, to Syntex Corporation, a corporation of Panama
No Drawing. Filed Oct. 13, 1958, Ser. No. 766,707
Claims priority, application Mexico Oct. 15, 1957
9 Claims. (Cl. 260—239.55)

The present invention relates to cyclopentanophenanthrene compounds and a process for the production thereof.

More particularly the present invention relates to a novel process for the production of the 6α-fluoro-cortisone, an active anti-inflammatory cortical type hormone starting from the 21-esters of 16α,17α-oxido-Δ⁵-pregnen-3β,21-diol-11,20-dione and to certain novel intermediates.

In the U.S. patent application of Djerassi, Halpern and Mancera, Serial No. 765,056, filed October 3, 1958, there is disclosed the production of the 21-esters (for example the acetate) of 16α,17α-oxido-Δ⁵-pregnen-3β,21-diol-11,20-dione.

In accordance with the present invention it has been discovered that opening of the 16α,17α-oxido group of the acetate of 16α,17α-oxido-Δ⁵-pregnen-3β,21-diol-11,20-dione with hydrogen bromide gave the 21-acetate of 16β-bromo-Δ⁵-pregnen - 3β,17α,21 - triol-11,20-dione and removal of the 16β-bromo group with Raney nickel gave the 21-acetate of Δ⁵-pregnen-3β,17α,21-triol - 11,20 - dione. Treatment of this compound with formic acid followed by treatment with acetic anhydride produced the 3-formate-17, 21-diacetate which on partial saponification gave the 17,21-diacetate. The double bond of the 17,21-diacetate of Δ⁵-pregnen-3β,17α,21-triol-11,20-dione on treatment with an aromatic peracid was epoxidized to give the 17,21-diacetate of 5α,6α-oxido-pregnan-3β,17α,21-triol-11,20-dione. Treatment with boron trifluoride, oxidation of the 3-hydroxy group, dehydration and inversion then gave the 17,21-diacetate of 6α-fluorocortisone which was conventionally saponified.

The following equation illustrates the process of the preesnt invention and novel intermediates:

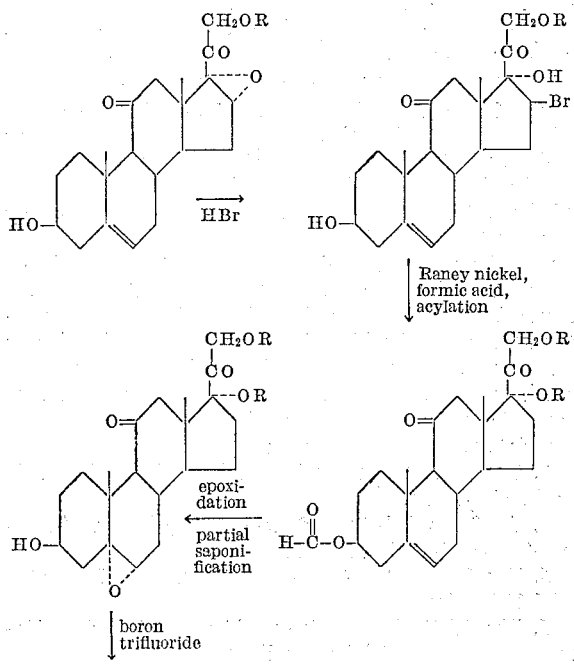

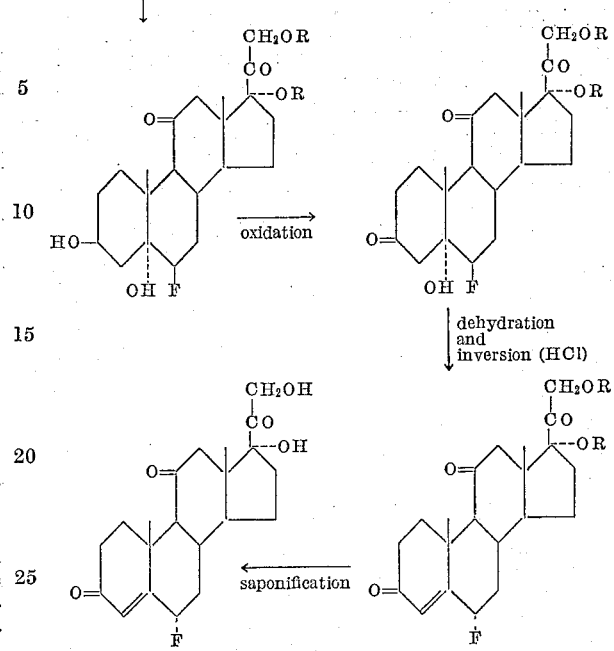

In the above equation R represents an acyl group of a hydrocarbon carboxylic acid of less than 12 carbon atoms conventional in the steroid art. These acyl groups may be saturated or unsaturated, straight or branched chain aliphatic, cyclic or mixed cyclic aliphatic. Typical are the acetate, propionate, benzoate and cyclopentylpropionate. It may be noted further that lower fatty acid esters such as acetic are especially desirable for use in the reaction.

In practicing the process of the invention above set forth, an ester preferably the 21-mono acetate of 16α,17α-oxido-Δ⁵-pregnen-3β,21-diol-11,20-dione in an organic solvent such as methylene dichloride is reacted with hydrogen bromide in acetic acid to obtain the corresponding 21-acetate of 16β-bromo-Δ⁵-pregnen-3β,17α,21-triol-11,20-dione. This compound is then treated with Raney nickel in a lower aliphatic alcohol under reflux conditions to remove the 16-bromo and substitute hydrogen therefor. The resultant 21-acetate of Δ⁵-pregnen-3β,17α,21-triol-11,20-dione was then treated with formic acid to form the corresponding 3-formate-21-acetate. Treatment of this diester with an excess of lower fatty acid anhydride preferably acetic and preferably in the presence of an acid catalyst such as p-toluenesulfonic acid then produced the 3-formate-17,21-diacetate of Δ⁵-pregnen-3β,17α,21-triol-11,20-dione. This triester was then partially saponified with acid to produce the 17,21-diacetate and treatment of the diacetate with an aromatic peracid gave the 17,21-diacetate of 5α,6α-oxido-pregnan - 3β,17α,21 - triol-11,20-dione. Treatment of this compound with boron trifluoride preferably in the form of its etherate under the conditions more completely outlined in our U.S. patent application Serial No. 753,629, filed August 7, 1958, gave as an intermediate the 17,21-diacetate of 6β-fluoro-pregnan-3β,5α,17α,21-tetrol-11,20-dione.

The 3-hydroxy group of this compound was then conventionally oxidized to a 3-keto group and the resultant 17,21-diacetate of 6β-fluoro-pregnan-5α,17α,21-triol-3,11,20-trione was then treated with dry hydrogen chloride in acetic acid as described in the aforementioned application to form the 17,21-diacetate of 6α-fluoro-cortisone. Conventional saponification of this diester gave the free compound.

The following specific examples serve to illustrate but are not intended to limit the present invention.

Example 1

A stirred solution of 7.5 g. of the 21-acetate of 16α,17α-oxido-Δ⁵-pregnen-3β,21-diol-11,20-dione in 150 cc. of methylene dichloride was treated dropwise with 5.1 cc. of a 30% solution of dry hydrogen bromide in acetic acid which was added in the course of 10 minutes. After the addition of water the organic layer was separated, washed with water, dried over anhydrous sodium sulfate, filtered and evaporated to dryness under reduced pressure below 35° C. There was thus obtained the 21-acetate of 16β-bromo-Δ⁵-pregnen-3β,17α,21-triol-11,20-dione. The analytical sample was obtained by recrystallization from acetone-hexane.

7.5 g. of the crude 21-acetate of 16β-bromo-Δ⁵-pregnen-3β,17α,21-triol-11,20-dione was added to a suspension of 15 g. of Raney nickel in 300 cc. of methanol, the mixture was refluxed for 2 hours with stirring, cooled, filtered under an atmosphere of nitrogen and the residue was washed with methanol. The combined filtrate and washings was evaporated to dryness and the residue crystallized from acetone-hexane to produce the 21-acetate of Δ⁵-pregnen-3β,17α,21-triol-11,20-dione.

A suspension of 6 g. of the above compound in 150 cc. of 85% formic acid was stirred for 2 hours while heating to 70° C. and then cooled. The crystalline precipitate of the 3-formate-21-acetate of Δ⁵-pregnen-3β,17α,21-triol-11,20-dione was collected by filtration.

A mixture of 5 g. of the above compound, 120 cc. of acetic anhydride and 1.7 g. of p-toluenesulfonic acid was stirred at room temperature for 9 hours and then poured into a mixture of ice and water. The mixture was stirred to hydrolyze the excess of anhydride and the crystalline precipitate was collected, washed with water, dried and recrystallized from acetone-hexane, thus producing the 3-formate-17,21-diacetate of Δ⁵-pregnen-3β,17α,21-triol-11,20-dione.

A solution of 5 g. of the above triester in 150 cc. of dioxane was mixed with 40 cc. of water containing 5 cc. of concentrated hydrochloric acid and stirred at room temperature for 8 hours. The mixture was poured into water and after keeping it overnight in the refrigerator the precipitate was filtered, washed with water, dried and recrystallized from acetone-hexane, thus giving the 17,21-diacetate of Δ⁵-pregnen-3β,17α,21-triol-11,20-dione.

A solution of 4 g. of the 17,21-diacetate of Δ⁵-pregnen-3β,17α,21-triol-11,20-dione in 80 cc. of chloroform was treated with 1.8 mols of perphthalic acid in ether, the mixture was kept standing at room temperature for 20 hours and then poured into water. The organic layer was separated, washed with water, sodium bicarbonate solution and water, dried over anhydrous sodium sulfate, filtered and evaporated to dryness under reduced pressure. Crystallization of the residue from acetone-hexane yielded the 17,21-diacetate of 5α,6α-oxido-pregnan-3β,17α,21-triol-11,20-dione.

A solution of 3 g. of the 17,21-diacetate of 5α,6α-oxido-pregnan-3β,17α,21-triol-11,20-dione in 300 cc. of a mixture of equal parts of ether and benzene was treated with 3 cc. of boron trifluoride etherate. The mixture was kept for 3 hours at room temperature, water was added followed by 300 cc. of ether and the organic layer was separated and washed with water, dried over anhydrous sodium sulfate and evaporated to dryness. The residue was purified by chromatography on neutral alumina to give the 17,21-diacetate of 6β-fluoro-pregnan-3β,5α,17α,21-tetrol-11,20-dione.

2 g. of the 17,21-diacetate of 6β-fluoro-pregnan-3β,5α,17α,21-tetrol-11,20-dione was dissolved in 100 cc. of acetone, cooled to 0° C. and treated dropwise with stirring, while the temperature was maintained below 0° C., with a solution of 8 N chromic acid which had been prepared by dissolving 1.2 g. of chromic acid in concentrated sulfuric acid and diluted with water. The mixture was stirred for a further 5 minutes at 0° C. and then diluted with water and extracted with ether. The extract was washed with water, dried over anhydrous sodium sulfate, filtered and evaporated to dryness. Crystallization of the residue from acetone-hexane yielded the 17,21-diacetate of 6β-fluoro-pregnan-5α,17α,21-triol-3,11,20-trione.

1.8 g. of the 17,21-diacetate of 6β-fluoro-pregnan-5α,17α,21-triol-3,11,20-trione was dissolved in 80 cc. of acetic acid and a slow stream of dry hydrogen chloride was introduced into the solution for 2 hours at a temperature of around 18° C. The solution was poured into ice water, the precipitate formed was filtered, washed with water, dried and recrystallized from acetone-hexane. There was thus obtained the 17,21-diacetate of 6α-fluoro-cortisone.

1 g. of the diacetate of 6α-fluoro-cortisone was suspended in 10 cc. of absolute methanol, cooled to 0° C. and mixed with a methanol solution of sodium methoxide prepared by dissolving 140 mg. of sodium metal in 10 cc. of absolute methanol. The addition was done dropwise at 0° C. with stirring under at atmosphere of nitrogen. The stirring was continued for one hour further at 0° C. and the mixture was then poured into 100 cc. of an ice cold saturated solution of sodium chloride containing 0.5 cc. of acetic acid. The precipitate was collected, washed with water and recrystallized from acetone, thus furnishing 6α-fluoro-cortisone.

We claim:

1. A method for preparing 6α-fluoro-cortisone, comprising opening the epoxide ring of the 21-acetate of 16α,17α-oxido-Δ⁵-pregnen-3β,21-diol-11,20-dione by reaction with hydrogen bromide to form the 21-acetate of 16β-bromo-Δ⁵-pregnen-3β,17α,21-triol-11,20-dione, substituion of the bromine of this bromohydrin by hydrogen by treatment with Raney nickel to obtain the 21-acetate of Δ⁵-pregnen-3β,17α,21-triol-11,20-dione, reacting this last compound with acetic anhydride to form the 17,21-diacetate thereof, epoxidation of the double bond of the 17,21-diacetate to produce the 17,21-diacetate of 5α,6α-oxido-pregnan-3β,17α,21-triol-11,20-dione, opening of epoxide ring of the last compound by reaction with boron trifluoride etherate to form the 17,21-diacetate of 6β-fluoro-pregnan-3β,5α,17α,21-tetrol-11,20-dione, oxidation of the hydroxyl group at C-3 of this compound, dehydration of the resulting 17,21-diacetate of 6β-fluoro-pregnan-5α,17α,21-triol-3,11,20-trione, with simultaneous inversion of the steric configuration at C-6 by reaction with hydrogen chloride in acetic acid, to obtain the 17,21-diacetate of 6α-fluoro-cortisone, and saponification of the latter to the free 6α-fluoro-cortisone.

2. A method for the production of the 17,21-di lower fatty acid acylate of 5α,6α-oxido-pregnan-3β,17α,21-triol-11,20-dione comprising treating a 21-lower fatty acid ester of 16α,17α-oxido-Δ⁵-pregnen-3β,21-diol-11,20-dione with hydrogen bromide to form the corresponding 21-lower fatty acid ester of 16β-bromo-Δ⁵-pregnen-3β,17α,21-triol-11,20-dione, removing the 16-bromo group of the last mentioned compound to form the 21-lower fatty acid ester of Δ⁵-pregnen-3β,17α,21-triol-11,20-dione by reaction with Raney nickel, reacting the last mentioned compound with formic acid to form the 3-formate-21-lower fatty acid acylate thereof, reacting the last mentioned compound with a lower fatty acid anhydride to form the 3-formate-17,21-di lower fatty acid acylate, partially saponifying this last mentioned compound to form the corresponding 17,21-diacylate and treating the diacylate with an aromatic peracid.

3. The process of claim 2 wherein the lower fatty acid acylate is acetate.

4. A 21-lower fatty acid ester of 16β-bromo-Δ⁵-pregnen-3β,17α,21-triol-11,20-dione.

5. The 21-acetate of 16β-bromo-Δ⁵-pregnen-3β,17α,21-triol-11,20-dione.

6. The 17,21-di lower fatty acid ester of 5α,6α-oxido-pregnan-3β,17α,21-triol-11,20-dione.

7. The 17,21-diacetate of 5α,6α-oxido-pregnan-3β,17α,21-triol-11,20-dione.

8. The 17,21-di lower fatty acid ester of 6β-fluoro-pregnan-3β,5α,17α,21-tetrol-11,20-dione.

9. The 17,21-diacetate of 6β-fluoro-pregnan-3β,5α,17α,21-tetrol-11,20-dione.

References Cited in the file of this patent

UNITED STATES PATENTS

| | | |
|---|---|---|
| 2,805,230 | Stork et al. | Sept. 3, 1957 |
| 2,841,600 | Hogg et al. | July 1, 1958 |
| 2,883,403 | Rothman et al. | Apr. 21, 1959 |
| 2,899,448 | Beal et al. | Aug. 11, 1959 |
| 2,951,840 | Ringold et al. | Sept. 6, 1960 |
| 2,998,436 | Rothman et al. | Aug. 29, 1961 |